(12) United States Patent
Clanin et al.

(10) Patent No.: US 9,989,943 B2
(45) Date of Patent: Jun. 5, 2018

(54) HVAC SYSTEMS AND CONTROLS

(71) Applicant: TRANE INTERNATIONAL INC., Piscataway, NJ (US)

(72) Inventors: Thomas J. Clanin, La Crescent, MN (US); Scott A. Munns, Onalaska, WI (US); Lee L. Sibik, Onalaska, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 305 days.

(21) Appl. No.: 14/683,359

(22) Filed: Apr. 10, 2015

(65) Prior Publication Data

US 2015/0292762 A1 Oct. 15, 2015

Related U.S. Application Data

(60) Provisional application No. 61/978,674, filed on Apr. 11, 2014.

(51) Int. Cl.
| | | |
|---|---|---|
| *G05B 15/02* | (2006.01) | |
| *F25B 49/02* | (2006.01) | |
| *F04C 28/12* | (2006.01) | |
| *F04C 18/16* | (2006.01) | |

(52) U.S. Cl.
CPC .......... *G05B 15/02* (2013.01); *F04C 18/16* (2013.01); *F04C 28/12* (2013.01); *F25B 49/02* (2013.01); *F04C 2270/0525* (2013.01); *F25B 2500/19* (2013.01); *F25B 2600/0262* (2013.01); *F25B 2600/111* (2013.01); *F25B 2600/2513* (2013.01); *F25B 2700/13* (2013.01); *F25B 2700/151* (2013.01); *F25B 2700/1931* (2013.01); *F25B 2700/1933* (2013.01); *F25B 2700/21151* (2013.01); *F25B 2700/21152* (2013.01); *Y02B 30/743* (2013.01)

(58) Field of Classification Search
CPC .......... G05B 15/02; F04C 18/16; F04C 28/12; F04C 2270/0525; F25B 49/02; F25B 2700/1931; F25B 2600/0262; F25B 2700/1933; F25B 2700/21151; F25B 2700/151; F25B 2700/13; F25B 2600/2513; Y02B 30/743
See application file for complete search history.

(56) References Cited

U.S. PATENT DOCUMENTS

| | | | |
|---|---|---|---|
| 4,351,160 A | 9/1982 | Kountz et al. | |
| 4,516,914 A | 5/1985 | Murphy et al. | |
| 4,610,612 A * | 9/1986 | Kocher | F04C 28/125 417/310 |
| 5,027,608 A * | 7/1991 | Rentmeester | F04C 28/00 417/45 |

(Continued)

OTHER PUBLICATIONS

International Search Report and Written Opinion for International Application No. PCT/US2015/025312, dated Jul. 16, 2015, 11pgs.

(Continued)

*Primary Examiner* — Kenneth M Lo
*Assistant Examiner* — Istiaque Ahmed
(74) *Attorney, Agent, or Firm* — Hamre, Schumann, Mueller & Larson, P.C.

(57) ABSTRACT

The embodiments disclosed herein are directed to systems and methods to control a HVAC system based on a state of an unloader of a compressor of the HVAC system.

7 Claims, 6 Drawing Sheets

(56) References Cited

U.S. PATENT DOCUMENTS

| | | | |
|---|---|---|---|
| 5,509,273 A | | 4/1996 | Lakowske et al. |
| 6,082,971 A | * | 7/2000 | Gunn .................... F04B 39/066 417/32 |
| 6,121,735 A | * | 9/2000 | Igeta ...................... G01B 7/003 318/101 |
| 6,509,273 B1 | | 1/2003 | Imai et al. |
| 2007/0063668 A1 | | 3/2007 | Schnetzka et al. |
| 2009/0090118 A1 | * | 4/2009 | Pham ...................... F04B 39/06 62/228.5 |
| 2011/0083454 A1 | * | 4/2011 | Kopko .................. F25B 49/027 62/115 |

OTHER PUBLICATIONS

"Standard for Performance Rating of Positive Displacement Refrigerant Compressors and Compressor Units", ANSI/AHRI Standard 540, Air-Conditioning, Heating, and Refrigeration Institute, 2004.
Extended European Search Report, European Patent Application No. 15777229.4, dated Mar. 17, 2017 (7 pages).

* cited by examiner

HVAC SYSTEMS AND CONTROLS

FIELD

The disclosure herein relates to a heating, ventilation, and air conditioning (HVAC) system. More specifically, the disclosure herein is directed to systems and methods to control a HVAC system based on an unloader state (e.g., a relative position of a slide valve in a compressor).

BACKGROUND

A HVAC system typically includes a refrigeration circuit formed by a compressor, a condenser, an expansion device and an evaporator. Some HVAC systems may also include one or more fans to help heat exchange in the condenser and/or evaporator. The capacity of the HVAC system may be controlled based on, for example, an ambient temperature, a cooling/heating demand of a building. Some HVAC systems may include a variable speed fan and/or a compressor, where an operation speed of the fan and/or the compressor may be varied during operation.

SUMMARY

Systems and methods directed to control a HVAC system based on a state of an unloader of a compressor of the HVAC system are disclosed.

In some embodiments, a method of controlling a HVAC system may include obtaining an unloader state of a compressor of the HVAC system; obtaining a control parameter based on the unloader state; and controlling the HVAC system based on the control parameter.

In some embodiments, the unloader state may have an association with a measurable parameter of the compressor during operation. Obtaining the unloader state of the compressor of the HVAC system may include obtaining the measurable parameter during operation; and estimating the unloader state based on the association between the measurable parameter of the compressor and the obtained measurable parameter.

In some embodiments, controlling the HVAC system may include controlling a fan operation speed, an operation of a compressor, an orifice size of an expansion device, or a combination thereof. In some embodiments, the measurable parameter may be a current draw by the compressor.

In some embodiments, obtaining an unloader state of a compressor of the HVAC system may include obtaining a compressor operation condition; obtaining a measurable parameter of the compressor; and estimating the unloader state based on the compressor operation condition and the measurable parameter of the compressor.

In some embodiments, the compressor operation condition may include a saturated suction temperature at an inlet of the compressor, a saturated discharged temperature at an outlet of the compressor, or a combination thereof. In some embodiments, the measurable parameter of the compressor may include a current draw by the compressor, a torque of the compressor, a power of the compressor, or a combination thereof.

In some embodiments, the control parameter may be a volumetric flow rate, an actual mass flow rate, a rated mass flow rate, or a combination thereof.

In some embodiments, the method may include an unloader error check process, which may include controlling the unloader to adjust to a target unloader state; obtaining a second unloader state after the adjustment; comparing the second unloader state to the target unloader state; and providing an error message when the second unloader state is different from the target unloader state.

BRIEF DESCRIPTION OF THE DRAWINGS

Reference is now made to the drawings in which like reference numbers represent corresponding parts throughout.

DETAILED DESCRIPTION

Figure 1:
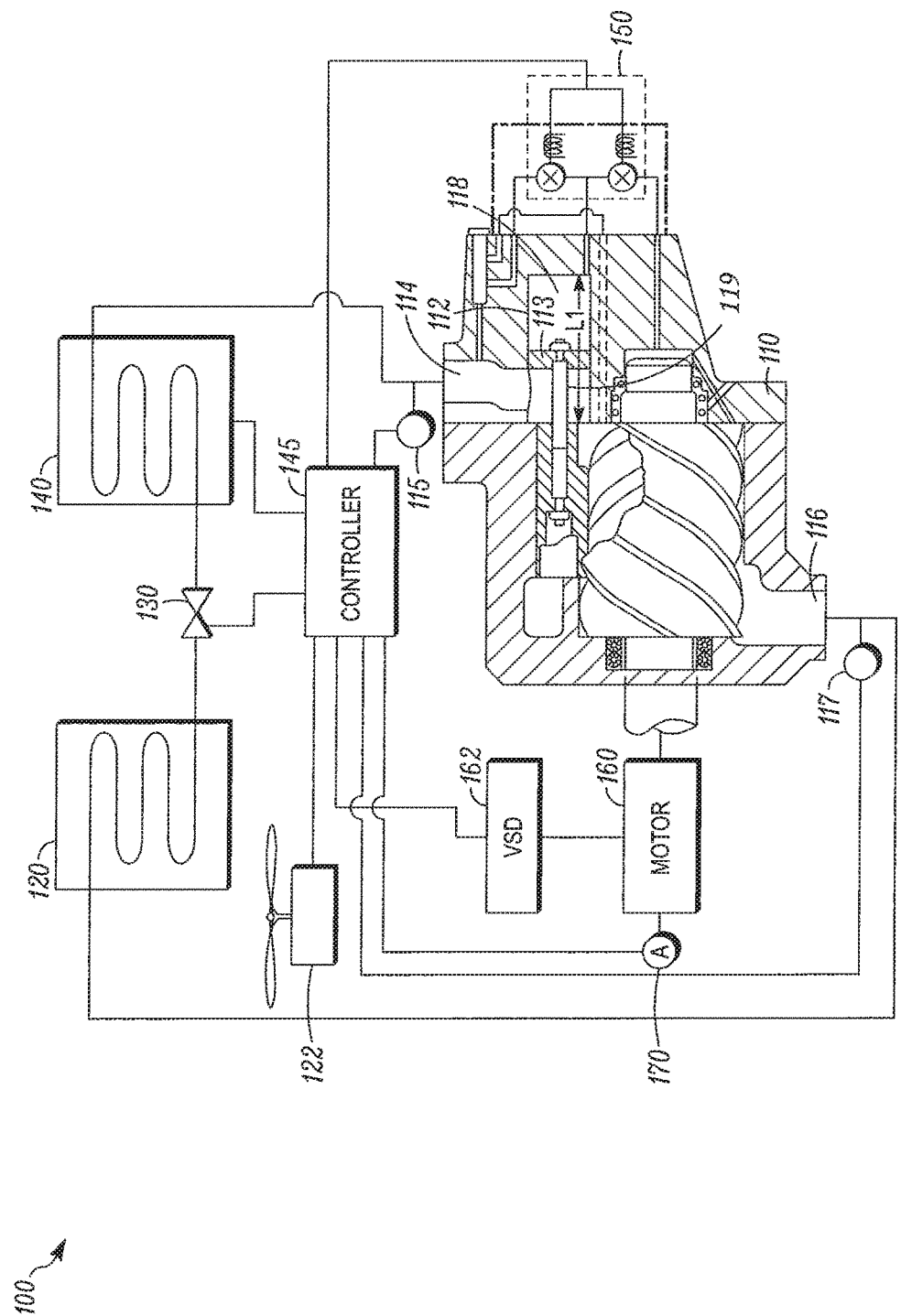
FIG. 1 illustrates a HVAC system.

A HVAC system, such as for example a chiller system, typically includes a refrigeration circuit formed by a compressor, a condenser, an expansion device and an evaporator. In some HVAC system, to control the HVAC system, the expansion device may be varied during operation. In some HVAC systems, an operation (e.g., a capacity) of the compressor may be varied during operation. The operation of the compressor may be varied, for example, by varying an operation speed of the compressor and/or an unloader of the compressor. Some HVAC systems may include one or more variable speed fans to help heat exchange in the condenser and/or the evaporator, and the operation speed of the fans may be varied during operation. The control of the expansion device, the fan operation speed, and/or the compressor capacity may be based on, for example, an ambient temperature, a building demand or other suitable parameters.

In some HVAC systems, such as for example a chiller system, the HVAC system may include a unit controller. The unit controller may be configured to control, for example, the expansion device, the fan operation speed, and/or the compressor capacity.

The disclosure is directed to systems and methods to control a HVAC system based on an unloader state of a compressor in the HVAC system. The term "control a HVAC system," "HVAC system control" or the like in this disclosure generally refers to regulation of an operation of a component (e.g. the expansion device, the fan, and/or the compressor) of the HVAC system during HVAC operation. Some examples of the HVAC system control may include, for example, a size of an orifice of the expansion device, an operation speed of a fan, and/or an operation (e.g., a capacity) of a compressor. The term "unloader" generally refers to a device that is configured to vary the operation (e.g., a capacity) of a compressor. Some exemplary types of unloaders may include, but are not limited to, a cylinder type, a suction bypass discharge type, or a suction slide type. An exemplary unloader is a gas actuated slide valve as disclosed in U.S. Pat. No. 6,509,273. The term "unloader state" generally refers to a variable parameter of the unloader. The variable parameter of the unloader may vary during the HVAC system operation and may have an association with the operation of a compressor. In the example of the unloader being a slide valve, the unloader state (e.g., the variable parameter of the unloader) may be a relative position of the slide valve, while the compressor operation may be the capacity of the compressor.

When the unloader state changes, (e.g., when a relative position of a slide valve changes), the compressor operation may change accordingly. For example, an amount of refrigerant intake by the compressor may change, resulting in a change in the compressor capacity. When the operation of the compressor changes, one or more measureable parameters of the compressor may change accordingly. The measurable parameters of the compressor operation may include, for example, a current draw of the compressor, a power of the compressor, a torque of the compressor, and/or an operation speed of the compressor. Accordingly, a measurable parameter (e.g., the current draw, the power of the compressor, the torque of the compressor, and/or the operation speed of the compressor) may have an association map with the unloader state. By measuring or deriving one or more measurable parameters of the compressor during operation, the unloader state may be estimated during operation based on the association map. The estimated unloader state may be used to obtain one or more control parameters (e.g. a compressor capacity, an actual or rated mass flow rate), which may be used to control components in the HVAC system.

It is to be appreciated that, in some embodiments, the unloader state may be measured directly. For example, in some embodiments, the unloader state may be measured by a sensor (e.g., a linear variable differential transformer (LVDT) position sensor). Such a sensor typically may be suitable for being placed inside the compressor and may be suitable for enduring a hostile environment inside the compressor during operation. The sensor may also need to form one or more electrical connections through a shell of the compressor. Estimating the unloader state can help avoiding using such as sensor inside the compressor.

It is to be appreciated that the embodiments as disclosed herein may be applied to a HVAC system including a fixed speed compressor, a fixed speed fan, a variable speed compressor, a variable speed fan, or the combination thereof. It is also appreciated that, in a HVAC system with more than one circuit, the embodiments as disclosed herein may be applied to each circuit.

References are made to the accompanying drawings that form a part hereof, and in which are shown by way of illustration of the embodiments in which the embodiments may be practiced. It is to be understood that the terms used herein are for the purpose of describing the figures and embodiments and should not be regarded as limiting in scope.

FIG. 1 illustrates an exemplary HVAC system 100 that includes a compressor 110, a condenser 120, an expansion device 130 and an evaporator 140. In the illustrated embodiment, the condenser is equipped with a condenser fan 122 to facilitate heat exchange in the condenser 120. The HVAC system 100, in some embodiments, may be a chiller system that is configured to provide cooling/heating to a building.

In the illustrated embodiment, the compressor 110 is driven by a motor 160. The motor 160 is a variable speed motor that may be driven by a variable speed drive (VSD) 162. It is to be appreciated that a fixed speed motor may be used in some embodiments.

The HVAC system 100 may include one or more temperature and/or pressure sensors that are configured to measure a temperature and/or pressure of the refrigerant. In the illustrated embodiment, the compressor 110 has an inlet 114 and an outlet 116, which are equipped with a temperature and/or temperature sensor 115 and 117 respectively. The HVAC system 100 may include a compressor operation measuring device 170 configured to measure a measurable parameter of operation of the compressor 110 (e.g., a current meter configured to measure a current draw by the motor 160 during operation).

The compressor 110 in the illustrated embodiment is a screw-type compressor with a slide valve type unloader 112 configured to control operation of the compressor 110 (e.g., a capacity of the compressor). The unloader 112 is positioned next to an inlet 114. The unloader 112 includes a piston 113 connected to a connection rod 119, and the piston 113 is configured to be slidable in a cylinder 118 along a longitudinal direction that is defined by a length L1 of the cylinder 118. A relative position of the piston 113 along the longitudinal direction may be varied by an actuator 150. By changing the relative position of the piston 113 along the longitudinal direction, a capacity of the compressor 110 may be regulated, which may affect the operation of the compressor.

The HVAC system 100 may include a controller 145 that is configured to control the operation of one or more components of the HVAC system 100 (e.g., the expansion device 130, the fan 122, the motor 160 and/or the unloader 112). In some embodiments, such as for example in a chiller system, the controller 145 may be a unit controller configured to control the operation of the components in the chiller system.

The controller 145 may typically include a processor, a memory, a clock, and an input/output (I/O) interface (not shown in the FIG. 1). In some embodiments, the controller 145 may include fewer or additional components.

The controller 145 may be configured to, for example, receive an operation condition of the HVAC system 100, such as for example, temperature and/or pressure measurement relative to the compressor 110 from the sensors 115 and/or 117, a measurable parameter measurement from the compressor operation measuring device 170 (e.g., a current draw by the motor 160), ambient temperature information, and/or building demand information, and control the components of the HVAC system 100 based on the information received. The controller 145 may control a size of an orifice the expansion device 130 to regulate, for example, an amount of refrigerant flowing through the expansion device 130. The controller 145 may control an operation speed of the fan 122 to regulate, for example, a heat exchange rate of the condenser 120. The controller 145 may also control the VSD 162, so that, for example, an operation speed of the motor 160 may be regulated. The controller 145 may also control the relative position of the piston 113 of the unloader 112, so that, for example, the capacity of the compressor 110 may be regulated. On example of regulating a capacity of a compressor by a sliding valve may be found in U.S. Pat. No. 6,509,273. It is to be appreciated that the unloader 112 may be a sliding valve or other suitable type of device.

In the embodiments as disclosed herein, an unloader state of the unloader 112 (e.g., the relative position of the piston 113 in the longitudinal direction) may be obtained (e.g., measured directly or estimated). The state of the unloader 112 may be used, for example, by the controller 145 to obtain one or more control parameters, which can be used by the controller 145 to control the HVAC system.

By using the state of the unloader 112, other control parameters, such as for example, a compressor capacity, a volumetric flow rate, an actual mass flow rate, or a relative mass flow rate, may be calculated or derived. These control parameters may be used by the controller 145 to control the components of the HVAC system 100. For example, in some embodiments, the mass flow rate may be used to control the operation speed of the fan 122 and/or the expansion device 130. In some embodiments, using the unloader state 112 to control the HVAC system 100 may help establish a relatively linear control of the HVAC system 100.

Generally, the state of the unloader 112 (e.g., the relative position of the piston 113) may have an association map with the operation (e.g., the capacity) of the compressor 110. Incorporating the estimated or measured state of the unloader 112 into the control of the HVAC system 100 may help coordinate the control of the compressor 110 and the control of other components.

For example, in some embodiments, the unloader state may be used to optimize the operation of the compressor 110. At the meantime, the controller 145 may derive a control parameter (e.g., a mass flow rate used in a control of a fan or an expansion device) based on the unloader state, and use the control parameter to control, for example, the fan 122, and/or the expansion device 130. By taking into account the unloader state, the control of the compressor 110 can be coordinated with the control of the fan 122 and/or the expansion device 130. This may help increase the control performance of the HVAC system 100. Specific control performance goals may be more responsive to system disturbances or load change, which may help improve operational reliability of the HVAC system 100.

It is to be appreciated that the compressor 110 may be a screw type compressor, or other suitable type of compressor. Generally, a suitable type of compressor is a compressor that includes an unloader with a variable state, where the unloader state can be varied to regulate, for example, an operation (e.g. a capacity) of the compressor.

Figure 2:
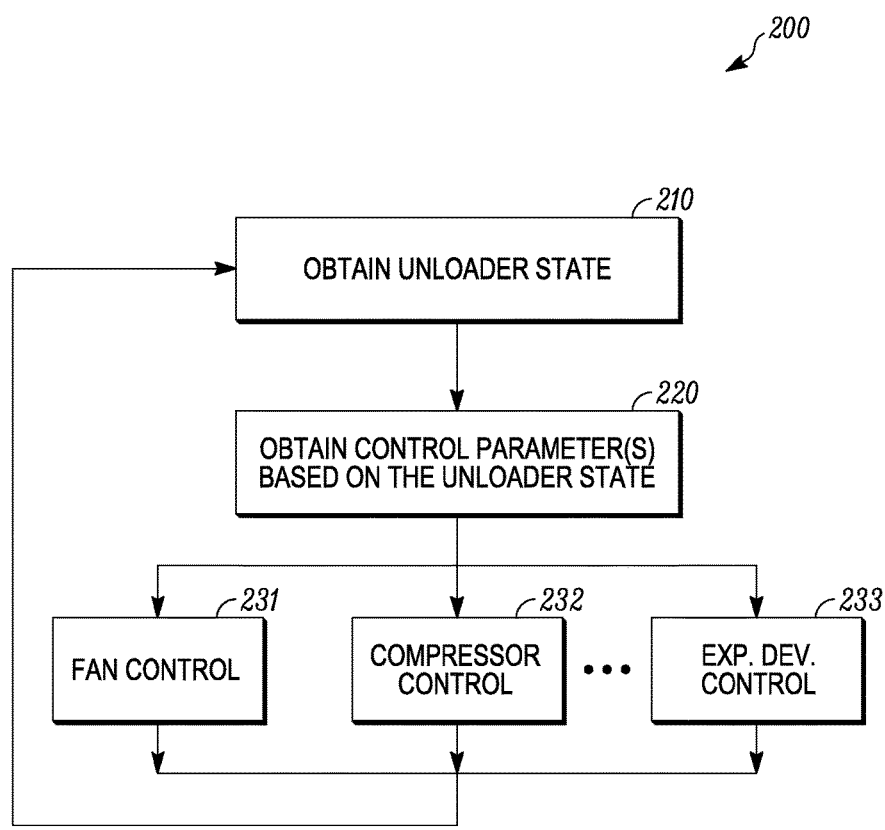
FIG. 2 illustrates a method of controlling a HVAC system.

FIG. 2 illustrates a method 200 to control a HVAC system (e.g., the HVAC system 100 in FIG. 1). The method 200 may be executed, for example, by a controller (e.g., the controller 145), of the HVAC system.

Figure 6:
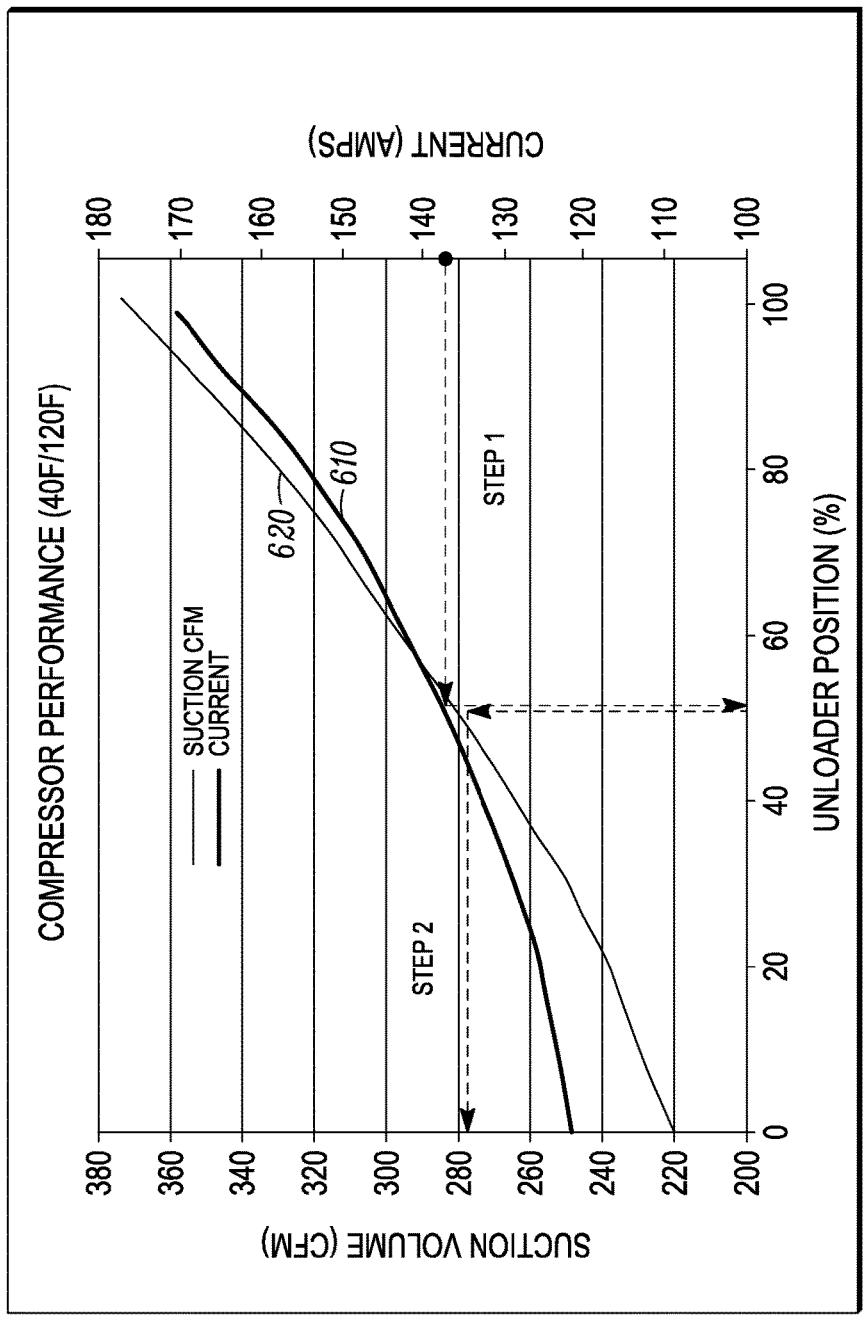
FIG. 6 illustrates an example of estimating unloader state and obtaining a control parameter based on the estimated unloader state.

In 210, an unloader state of an unloader in a compressor is obtained during operation. The unloader state may be obtained by, for example, direct measurement or observation. The unloader state may also be obtained by estimation based on one or more measurable parameters of the compressor operation that may have an association with the unloader state. FIG. 6 illustrates an example of estimating the unloader state based on a current draw by the compressor, which has an association map with the unloader state.

In 220, based on the unloader state, a control parameter(s) is obtained. The control parameter(s) generally refer to one or more parameters that may be used by the HVAC system to control components of the HVAC system during operation. Some exemplary control parameters may include an actual or rated refrigerant mass flow rate, a compressor capacity, a control sequence, a heat transfer rate, and/or an operation mode.

In 231 to 233, the control parameter(s) obtained from 220 is used to control components of the HVAC system. For example, in 231, the control parameter(s) may be used to control a fan (e.g., an operation speed of the fan). In 232, the control parameter(s) may be used to control the compressor (e.g., an operation speed of the compressor and/or an unloader state of the compressor). In 233, the control parameter(s) may be used to control an expansion device (e.g., a size of an orifice of the expansion device).

The term "control sequence" generally refers to an order of control to the components of the HVAC system. For example, in some embodiments, the orifice size of the expansion device may be changed from a first position to a second position. Then a fan speed may be regulated while maintaining the orifice size of the expansion device at the second position. In some embodiments, when a variable speed compressor with an unloader is used, the control sequence may refer to an order of controlling the compressor operation by either the unloader state control or the operation speed control in 233. By knowing the unloader state, for example, the control sequence of the compressor may allow optimizing by varying the operation speed while maintaining the unloader state. The control sequence of the compressor may also allow optimizing or varying the unloader state while maintaining the operation speed. The control sequence of the compressor in 233 may be optimized for, for example, efficiency (e.g., save energy), performance goals (e.g., a capacity, sound reduction).

For any given part load compressor operating point, there may be an infinite number of combinations of compressor operation speed and unloader state that can generate the same compressor capacity (or mass flow). Some combinations may yield a relatively high efficiency than the other combinations. In some embodiments, an optimized combination can be determined by testing the relationship between the compressor operation speed and the unloader state. These combinations can be provided to the controller as one or more specific rules or look up tables. In some embodiments, the controller may be configured to determine the optimized combination, based on, for example, system measurements.

In some embodiments, the combination of compressor speed and unloader state can result in the compressor operating beyond safe limits. Knowing the unloader state may allow the controller to avoid these conditions.

Figure 3:
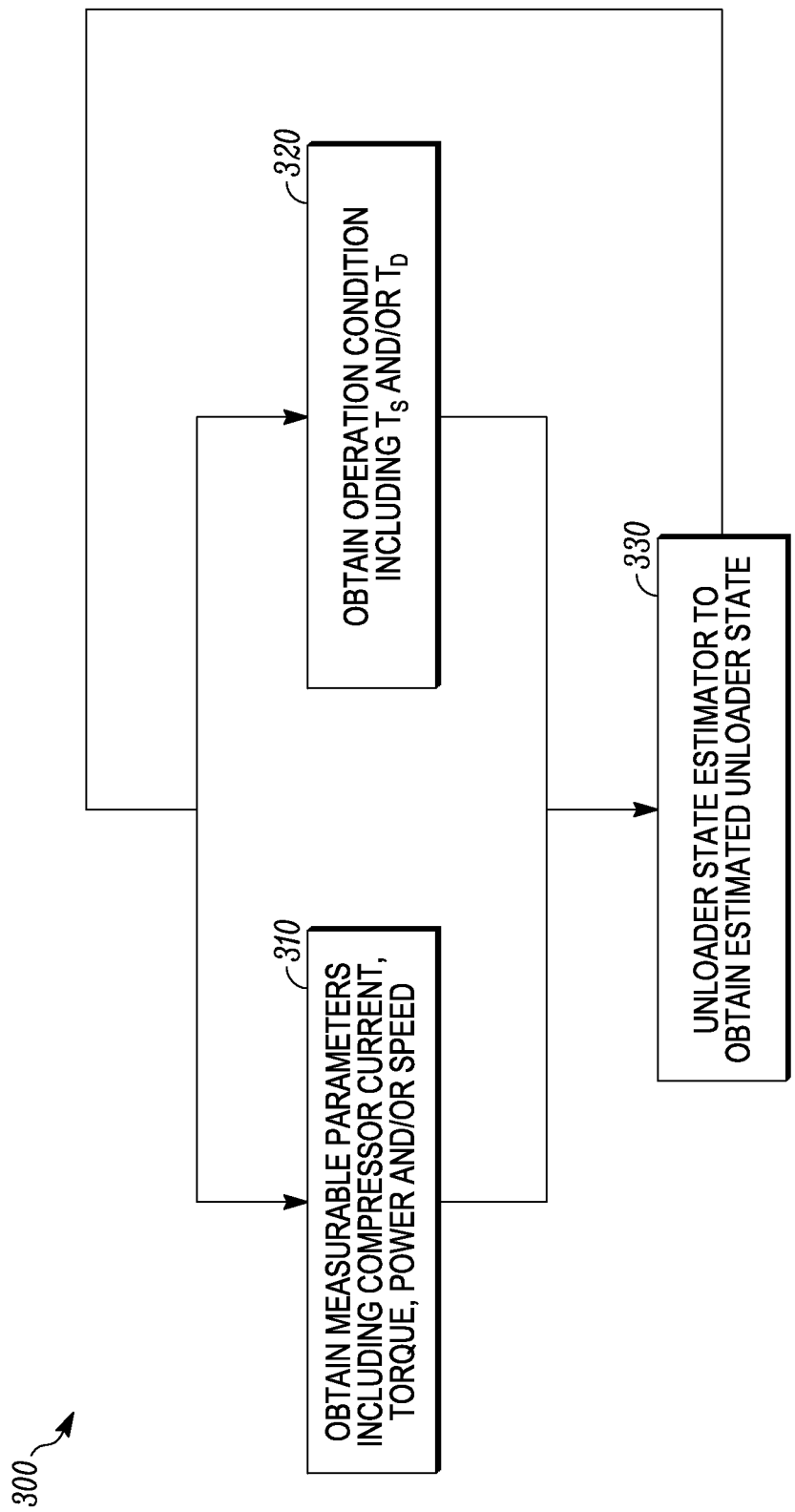
FIG. 3 illustrates a system and method of obtaining an unloader state in a HVAC system.
Figure 4:
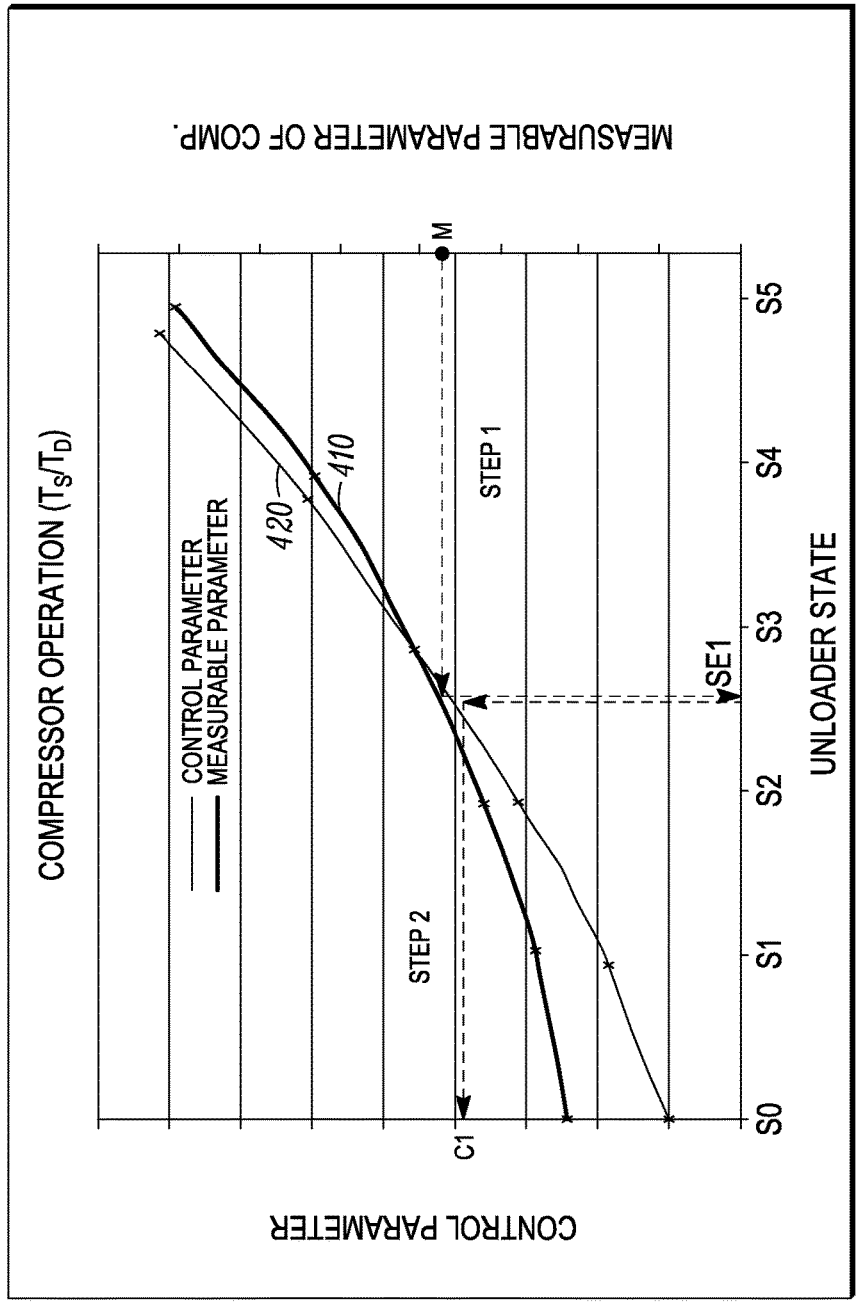
FIG. 4 illustrates a schematic method of estimating an unloader state based on a measurable parameter and a method of obtaining a control parameter based on the estimated unloader state.

Referring to FIGS. 3 and 4, a system and a method of estimating an unloader state are provided. Generally, the unloader may be configured to regulate, for example, an operation (e.g., a capacity) of a compressor. Therefore, an unloader state may have an association with the operation of the compressor.

When the operation of the compressor varies, one or more measurable parameters of the compressor operation, e.g., a current draw, a torque, a power and/or an operation speed of the compressor may vary accordingly. The operation of the compressor may also be affected by a compressor operation condition, such as for example, a saturated suction temperature ($T_s$) (e.g., a refrigerant temperature at the inlet 114 of the compressor 110) and a saturated discharge temperature ($T_d$) (e.g., a refrigerant temperature at the outlet 116 of the compressor 110).

By obtaining one or more operation conditions of the compressor, e.g., the saturated suction temperature $T_s$, the saturated discharge temperature $T_d$, as well as the measurable parameters of the compressor operation, e.g., the current draw, the torque, the power and/or the operation speed of the compressor, the compressor operation may be obtained. The unloader state may be estimated based on an association map established between the compressor operation and the unloader state.

Referring to FIG. 3, in 310, one or more measurable parameters of compressor operation, e.g., the current, the torque, the power, and/or the speed of the compressor may be obtained from sensors provided in the HVAC system or derived from a value(s) measured by a sensor in the HVAC system. For example, the current may be measured by a current meter configured to measure a current draw by a motor of the compressor (e.g., the compressor operation measuring device 170 for the motor 160). In some embodiments, the current may be reported by a VSD of the motor (e.g., the VSD 162 for the motor 160). In some embodiments, the torque may be measured by a torque meter. In some embodiments, the speed of the compressor may be reported by the VSD.

In 320, the saturated suction temperature $T_s$ and the saturated discharge temperature $T_d$ may be obtained from sensors in the HVAC system or derived from a value(s) measured by a sensor in the HVAC system. For example, the saturated suction temperature $T_s$ and the saturated discharge temperature $T_d$ may be measured by temperature sensors (e.g., the inlet temperature/pressure sensor 115 and outlet temperature/pressure sensor 117 in FIG. 1). It is to be noted that the saturated suction temperature $T_s$ and the saturated discharge temperature $T_d$ are interchangeable with the saturated suction pressure and the saturated discharge pressure respectively, as one value may be derived from the other value. It is to be appreciated that other parameters (e.g., a suction superheat temperature) that may affect the compressor operation may also be obtained and used to derive the compressor operation.

In 330, the compressor operation condition including the saturated suction temperature $T_s$ and the saturated discharge temperature $T_d$, as well as the measurable parameters including the current draw, the torque, the power and/or the speed are received by an unloader state estimator, for example, in the controller 145. The unloader state estimator may be configured to estimate the unloader state based on the information provided.

Generally, the unloader state may be estimated based on a known association map between the unloader state and the operation of the compressor, where the operation of the compressor may be measured directly or derived from one or more measurements in the HVAC system, such as for example, the compressor operation conditions including the saturated suction temperature $T_s$ and the saturated discharge temperature $T_d$, as well as the measurable parameters of the compressor operation including, for example, a current draw, a torque, a power and/or a speed. These measurements may be received by an unloader state estimator, for example, in the controller to estimate the unloader state.

In some embodiments, the value(s) that may be used to derive the operation of the compressor can be provided by one or more devices or sensors that are already present in a typical HVAC system. There may not be a need to add more hardware for the purpose of deriving the compressor operation and the unloader state, which may help save the cost of implanting a HVAC control incorporating a HVAC control using the unloader state.

FIG. 4 illustrates a schematic method of estimating an unloader state based on one or more measurable parameters of compressor operation, and a method of deriving a control parameter based on the estimated unloader state. The one or more measureable parameters may be, for example, a compressor current draw, torque, power and/or speed. The term "a measurable parameter" generally refers to a parameter having an association with the compressor operation and that may be measured or detected by a device or sensor in the HVAC system. The value of the measurable parameter varies when the operation of the compressor varies.

It is known in the art that compressor operation, e.g., a compressor capacity, is a function of a saturated suction temperature $T_s$ and a saturated discharge temperature $T_d$ (a compressor operation function $f1(T_s, T_d)$). When the $T_s$ and $T_d$ are given, an association map between an unloader state and the one or more measurable parameters may be established. FIG. 4 illustrated one association map between the unloader state and the one or more measurable parameters. It is to be understood that a HVAC system may include one or more association maps of the unloader state and the measurable parameters corresponding, for example, to different $T_s$ and $T_d$.

As illustrated in FIG. 4, a compressor operation curve 410 represents an association map between an unloader state (e.g., the relative position of the piston 113 of the slide valve in the longitudinal direction defined by the length L1 in FIG. 1) and a measurable parameter (e.g., a compressor current draw) when specific $T_s$ and $T_d$ are given. This association map can be established, for example, in a laboratory setting or provided by a compressor manufacturer. The horizontal axis represents different unloader states, e.g., S0-S5. In each of the unloader states, S0-S5, a value of the measurable parameter may be measured, for example, in a laboratory setting. The measured values of the measurable parameter at each unloader state S0-S5 are represented in FIG. 4 by "X" points along the compressor operation curve 410. It is appreciated that the values of the measurable parameter may be measured at more than or less than the illustrated unloader states S0-S5.

Based on the measured values of the measurable parameter at each unloader state S0-S5, the association map (e.g., the curve 410) between the unloader state and the measurable parameter may be established by a mathematic approach, which may help establish a compressor operation function $f1(T_s, T_d)$ to represent the association map (e.g., as described below). In some embodiments, the association map between the unloader state and the measurable parameter may be represented by a multiple coefficient polynomials to estimate a curve that connects all the measured values of the measurable parameter (i.e. "X" points in FIG. 4). In one embodiment, the compressor operation function equation may be:

$$f1(T_s,T_d)=A1+A2T_d+A3T_d^2+A4Ts+A5T_sT_d+A6T_d^2T_s+A7T_s^2+A8T_dT_s^2+A9T_d^2T_s^2.$$

It is to be appreciated that other mathematic approaches may be used to establish the association map between the unloader state and the measurable parameter based on the measured values of the measurable parameter. Some mathematic approaches are listed in "Standard for Performance Rating of Positive Displacement Refrigerant Compressors and Compressor Units, 2004 Version", published by Air-Conditioning, Heating, and Refrigeration Institute, which is incorporated herein by reference in its entirety.

Based on the curve 410, an unloader state may be estimated based on a measured value of the measurable parameter.

A curve 420 in FIG. 4 illustrates an association map between the unloader state and a control parameter. This association map may be established, for example, in a laboratory setting. In some embodiments, for example, the control parameter may be established for each unloader state S0-S5, with the appreciation that the control parameter may be established for unloader states that are different from S0-S5. Similar to the curve 410, the curve 420 may be represented by a mathematic function $f2(T_s,T_d)$ using, for example, the mathematical approach similar to the mathematical approach described in regards to the curve 410.

Based on the curve 420, a control parameter may be obtained based on the unloader state. It is to be appreciated that the HVAC system may include more than one association map of control parameter and the unloader state. Based on the unloader state, one or more control parameters may be obtained.

By combining the curve 410 and the curve 420, a control parameter may be obtained based on the measurable parameter by using the estimated unloader state corresponding to the measurable parameter. A measured value M1 in FIG. 4 of the measurable parameter may be provided by a device and/or sensor in the HVAC system. For example, a current meter may provide a current draw by the compressor during operation. Based on the measured value M and the curve 410, an estimated unloader state SE1 may be obtained (e.g., step 1). Based on the estimated unloader state SE1 and the curve 420, a control parameter C1 may be obtained (e.g., step 2). The control parameter C1 may be used by a controller of the HVAC system to control the operation of one or more components in the HVAC system.

It is to be appreciated that the curves 410 and 420 may vary when $T_s$ and/or $T_d$ vary. For a specific combination of $T_s$ and/or $T_d$, the curves 410 and 420 may be, for example, established in a laboratory setting. The HVAC system may include one or more combinations of the curves 410 and 420 corresponding to different combinations of $T_s$ and/or $T_d$. When $T_s$ and/or $T_d$ change during operation, a different combination of the curves 410 and 420 corresponding to the operational $T_s$ and/or $T_d$ may be chosen to obtain the control parameter based on the measurable parameter as illustrated herein.

It is also to be appreciated that a controller (e.g. a unit controller in a chiller system) may include one or more association maps for different compressor frame sizes, compressor sizes and operation frequencies. In some embodiments, the controller may include six association maps for each available compressor. The controller may be used in HVAC systems with different compressors without inputting different association maps.

Figure 5:
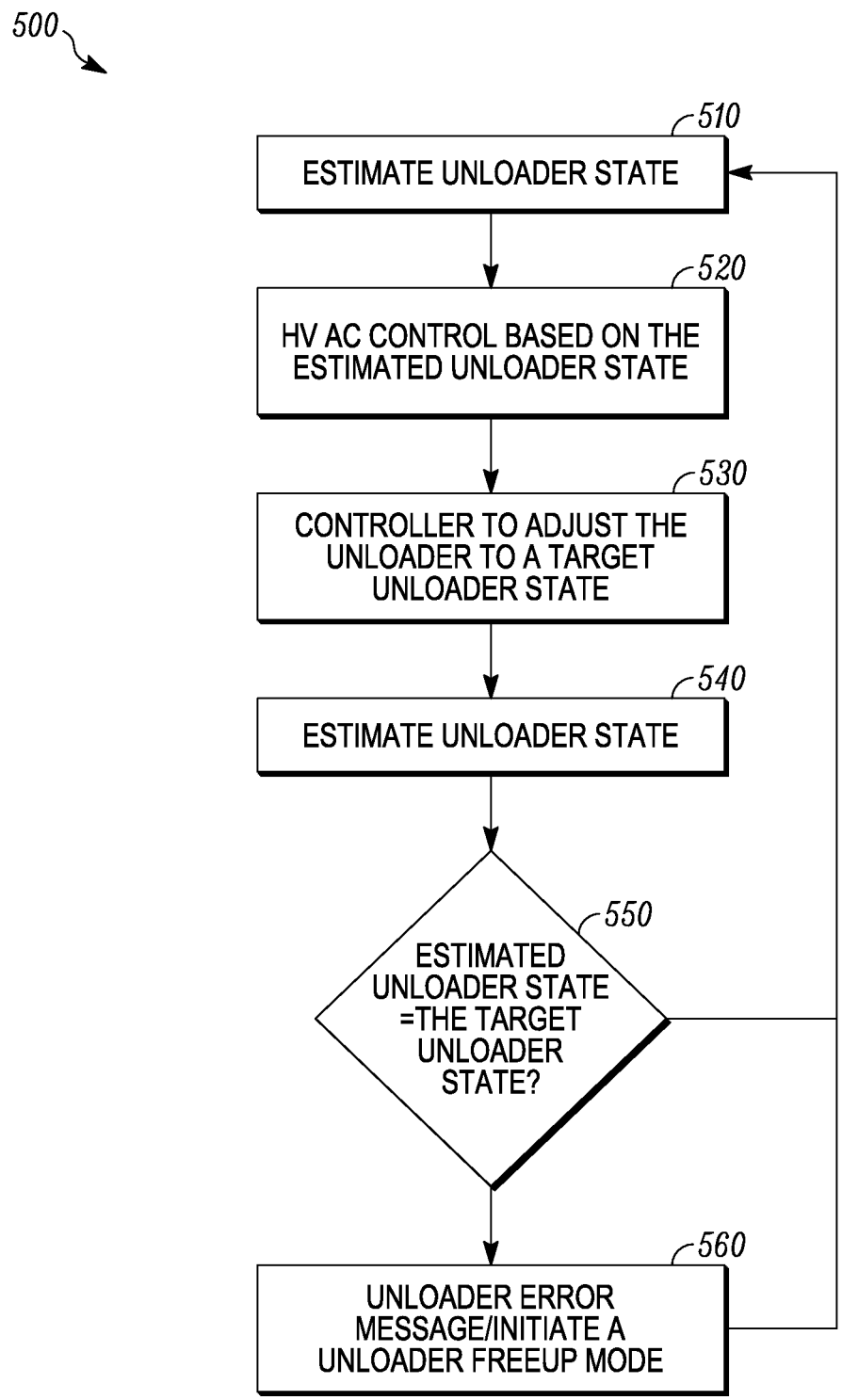
FIG. 5 illustrates a method of detecting faulty unloader operation in a HVAC system.

FIG. 5 illustrates a method 500 of detecting faulty unloader operation based on an estimated unloader state. In 510, an unloader state is estimated. In 520, the estimated unloader state is used to control a HVAC system. In 530, as a part of the HVAC system control, for example, a controller of the HVAC system sends a signal to adjust the unloader to a target unloader state (e.g. adjust a relative position in a slide valve). In 540, after the controller of the HVAC system sends the signal to adjust the unloader state, the unloader state is estimated. In 550, the estimated unloader state from 540 is compared to the target unloader state from 530. When the estimated unloader state in 540 matches the target unloader state in 530, which indicates that the unloader functions normally, the method 500 proceeds to 510 to estimate unloader state.

When the estimated unloader state from 540 does not match the target unloader state in 530, the unloader may experience a faulty operation that, for example, prevents the unloader adjusting to the target unloader state in 530. The method 500 may proceed to 560 to notify an operator with an unloader error message, or the method 500 may initiate an unloader free up operation mode configured to restore the normal operation of the unloader, or replace/service the unloader.

Example

FIG. 6 illustrates a portion of a HVAC control incorporating an estimated unloader state. In the illustrated embodiment, the HVAC system includes a screw compressor equipped with a piston slide valve type unloader, where a relative position of the unloader may be varied to regulate a compressor operation. The relative position of the unloader is illustrated as the horizontal axis, for example, as a percentage of a full opening of the slide valve.

The right vertical axis represents a current draw by the compressor. The left vertical axis represents a suction volume (cube feet per minute or cfm) of the compressor.

A curve 610 is an association map between the current draw by the compressor and the relative position of the unloader when the $T_s$, $T_d$ are about 40° F. and about 120° F. respectively. The curve 610 is established by measuring the current draw at five relative positions of the unloader corresponding to 0%, 25%, 50%, 75% and 100% of a full open range, and defining the curve 610, for example, by a function with nine coefficient polynomials.

A curve 620 is an association map between the position of the unloader and the suction volume (cfm) of the compressor when the $T_s$, $T_d$ are about 40° F. and about 120° F. respectively.

In operation, when the $T_s$, $T_d$ are about 40° F. and about 120° F. respectively, the curves 610 and 620 may be used by the HVAC system to control the HVAC system. For example, when a current draw is about 137 amps, based on the curve 610, the position of the unloader may be estimated at about 62% of the full movement range. Then, based on the curve 620, the suction volume may be estimated as about 275 cfm.

The suction volume may be used to, for example, determine one or more control parameters, such as for example, a compressor capacity, a control sequence, a volumetric flow rate, an actual mass flow rate and/or a rated mass flow rate. The one or more control parameters may be used by the controller (e.g., the controller 145) to control, for example, a fan speed, a size of an orifice of an expansion device, a state change to the unloader of a compressor and/or an operation speed of the compressor.

ASPECT

Aspect 1. A method of controlling a HVAC system, comprising:
    obtaining an unloader state of a compressor of the HVAC system;
    obtaining a control parameter based on the unloader state; and
    controlling the HVAC system based on the control parameter.

Aspect 2. The method of aspect 1, wherein the unloader state has an association with a measurable parameter of the compressor during operation, and obtaining the unloader state of the compressor of the HVAC system includes:
    obtaining the measurable parameter during operation; and
    estimating the unloader state based on the association between the measurable parameter of the compressor and the obtained measurable parameter.

Aspect 3. The method of any of aspects 1 to 2, wherein controlling the HVAC system includes, controlling a fan operation speed, an operation of a compressor, an orifice size of an expansion device, or a combination thereof.

Aspect 4. The method of any of aspects 2 to 3, wherein the measurable parameter is a current draw by the compressor.

Aspect 5. The method of any of aspects 1 to 4, wherein obtaining an unloader state of a compressor of the HVAC system includes:
    obtaining a compressor operation condition;
    obtaining a measurable parameter of the compressor; and
    estimating the unloader state based on the compressor operation condition and the measurable parameter of the compressor.

Aspect 6. The method of aspect 5, wherein the compressor operation condition includes a saturated suction temperature at an inlet of the compressor, a saturated discharged temperature at an outlet of the compressor, or a combination thereof.

Aspect 7. The method of aspect 5, wherein the measurable parameter of the compressor includes a current draw by the compressor, a torque of the compressor, a power of the compressor, or a combination thereof.

Aspect 8. The method of aspects 1 to 7, wherein the control parameter is an actual mass flow rate, a rated mass flow rate, or a combination thereof.

Aspect 9. The method of aspects 1 to 8, further comprising:
controlling the unloader to adjust to a target unloader state;
obtaining a second unloader state after the adjustment;
comparing the second unloader state to the target unloader; and
providing an error message when the second unloader state is different from the target unloader state.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

The invention claimed is:

1. A method of controlling a HVAC system, comprising:
obtaining an unloader state of an unloader of a compressor of the HVAC system, the unloader being a device located between an inlet and an outlet of the compressor and configured to control a gas flow through the compressor;
obtaining a control parameter based on the unloader state; and
controlling the HVAC system based on the control parameter,
wherein obtaining the unloader state of the compressor of the HVAC system includes:
obtaining a compressor operation condition;
obtaining a measurable parameter of the compressor; and
estimating the unloader state based on an association between the unloader state and the measurable parameter of the compressor according to the obtained compressor operation condition, the association between the unloader state and the measurable parameter of the compressor is represented by a first curve,
wherein obtaining the control parameter based on the unloader state is based on an association between the estimated unloader state and the control parameter according to the obtained compressor operation condition, and the association between the estimated unloader state and the control parameter is represented by a second curve.

2. The method of claim 1, wherein controlling the HVAC system includes, controlling a fan operation speed, an operation of a compressor, an orifice size of an expansion device, or a combination thereof.

3. The method of claim 1, wherein the compressor operation condition includes a saturated suction temperature at an inlet of the compressor, a saturated discharged temperature at an outlet of the compressor, or a combination thereof.

4. The method of claim 1, wherein the measurable parameter of the compressor includes a current draw by the compressor, a torque of the compressor, a power of the compressor, or a combination thereof.

5. The method of claim 1, wherein the control parameter is an actual mass flow rate, a rated mass flow rate, or a combination thereof.

6. The method of claim 1, further comprising:
controlling the unloader state to adjust to a target unloader state;
obtaining a second unloader state after the adjustment;
comparing the second unloader state to the target unloader state; and
providing an error message when the second unloader state is different from the target unloader state.

7. The method of claim 1, wherein the first curve is estimated by a first operation function having multiple coefficient polynominals, and the second curve is estimated by a second operation function having multiple coefficient polynominals.

* * * * *